(12) United States Patent
Kirkerud et al.

(10) Patent No.: US 9,934,454 B2
(45) Date of Patent: Apr. 3, 2018

(54) SYSTEM AND METHOD FOR READING FEATURES IN REVERSE VENDING MACHINES

(75) Inventors: Vidar Kirkerud, Lier (NO); Tom Lunde, Blommenholm (NO)

(73) Assignee: TOMRA SYSTEMS ASA, Asker (NO)

( * ) Notice: Subject to any disclaimer, the term of this patent is extended or adjusted under 35 U.S.C. 154(b) by 923 days.

(21) Appl. No.: 14/128,178

(22) PCT Filed: Jun. 22, 2012

(86) PCT No.: PCT/NO2012/050118
§ 371 (c)(1),
(2), (4) Date: Feb. 25, 2014

(87) PCT Pub. No.: WO2012/177148
PCT Pub. Date: Dec. 27, 2012

(65) Prior Publication Data
US 2014/0210967 A1 Jul. 31, 2014

Related U.S. Application Data

(60) Provisional application No. 61/500,952, filed on Jun. 24, 2011.

(30) Foreign Application Priority Data

Jun. 24, 2011 (EP) ..................................... 11171365

(51) Int. Cl.
*H04N 7/18* (2006.01)
*G06K 9/78* (2006.01)
*G07F 7/06* (2006.01)

(52) U.S. Cl.
CPC ............. *G06K 9/78* (2013.01); *G07F 7/0609* (2013.01); *H04N 7/18* (2013.01)

(58) Field of Classification Search
None
See application file for complete search history.

(56) References Cited

U.S. PATENT DOCUMENTS

| 4,656,510 A | 4/1987 | Mattila |
| 5,898,169 A | 4/1999 | Nordbryhn |
| 2010/0290767 A1 | 11/2010 | Lunde |

FOREIGN PATENT DOCUMENTS

| DE | 20 2007 003767 U1 | 7/2008 |
| EP | 0 174 549 A1 | 3/1986 |

(Continued)

OTHER PUBLICATIONS

English language version of First Office Action and Search Report dated Aug. 5, 2015, issued by the Chinese Patent Office in the corresponding Chinese Patent Application No. 2012800307502. (7 pages).

(Continued)

*Primary Examiner* — Heather Jones
(74) *Attorney, Agent, or Firm* — Buchanan Ingersoll & Rooney P.C.

(57) ABSTRACT

A method, an imaging and light source module insertable in a reverse vending machine, and a reverse vending machine including an opening for entering objects into a chamber, a plurality of light sources and a plurality of imaging devices allowing at least one feature of an object in the chamber to be read, wherein the plurality of imaging devices and the plurality of light sources are arranged as a plurality of imaging and light units around the perimeter of the chamber, wherein each imaging and light unit including one 2D imaging device and one light source, the 2D imaging device and the light source is viewing and illuminating the object at a first and a second oblique angle, respectively, wherein the first and second oblique angles are in the range 45-75° relative to a center-symmetrical line of the imaging and light units.

42 Claims, 8 Drawing Sheets

(56) References Cited

FOREIGN PATENT DOCUMENTS

| EP | 0 174 549 B1 | 11/1989 | | |
|----|----|----|----|----|
| EP | 2 107 534 A1 | 10/2009 | | |
| EP | 2 363 837 A1 | 9/2011 | | |
| JP | 2002107305 A | 4/2002 | | |
| JP | 2009095718 A | 5/2009 | | |
| JP | 2009175789 A | 8/2009 | | |
| JP | 2011503573 A | 1/2011 | | |
| WO | WO 2009/021515 A1 | 2/2009 | | |
| WO | WO 2009021515 A1 * | 2/2009 | ............. | B07C 5/126 |
| WO | WO 2009/061207 A1 | 5/2009 | | |
| WO | WO 2009061207 A1 * | 5/2009 | ........... | G07F 7/0609 |

OTHER PUBLICATIONS

Patent Examination Report No. 1 issued in corresponding Australian application 2012273535 dated May 28, 2015.
International Search Report (PCT/ISA/210) dated Aug. 1, 2012, by the European Patent Office as the International Searching Authority for International Application No. PCT/NO2012/050118.
International Preliminary Report on Patentability (PCT/IPEA/409) dated Oct. 17, 2013, by the European Patent Office as the International Preliminary Examining Authority for International Application No. PCT/NO2012/050118.
Search Report dated Nov. 4, 2011, by the European Patent for Application No. 11171365.7.
An English Translation of the Japanese Office Action (Notice of Reasons for Rejection) issued on Aug. 9, 2016, by the Japanese Patent Office in corresponding Japanese Patent Application No. 2014-516943, (2 pages).

* cited by examiner

SYSTEM AND METHOD FOR READING FEATURES IN REVERSE VENDING MACHINES

FIELD OF USE

The present disclosure relates to reverse vending machines, and in particular to deriving information relating to features of objects in reverse vending machines.

BACKGROUND

Systems for recycling of returnable containers, for example beverage containers, have been in place for many years as a means to prevent littering and conserve resources. Such systems were originally based on manual handling of returned containers by vendors, but the process has been made more efficient by the introduction of reverse vending machines which were able to accept empty containers, verify the authenticity of the container, and issue a receipt that can be exchanged for cash or used as payment in the store where the reverse vending machine is located.

Over the years reverse vending machines have been made more efficient and sophisticated. They are now typically able to handle a wide range of containers made from various materials, most often glass, PET (polyethylene terephthalate), steel and aluminum. A reverse vending machine is typically able to receive the containers, validate them based on shape and other physical characteristics as well as bar codes and other markings, and sort them based on material or type. Some machines are able to store reusable containers while containers that are only recycled for their material are crushed and stored separately. A reverse vending machine should be able to reject non-returnable containers, detect and handle fraud attempts and assign the proper deposit return value to a wide range of containers. At the same time a machine must be reliable and regular maintenance should not be work intensive or require frequent replacement of parts.

Consequently, there is a need for constant improvement of reverse vending machines in order to meet these challenges as well as new challenges resulting from for example introduction of new types of returnable containers, and more sophisticated fraud attempts.

SUMMARY

According to an aspect of the present disclosure there is provided a reverse vending machine comprising an opening 12 for inserting objects into the interior 20 of the machine, a plurality of light sources and a plurality of 2D imaging devices, wherein the plurality of 2D imaging devices and the plurality of light sources are arranged as a plurality of imaging and light units 40 around the perimeter of the interior 20, wherein the imaging and light units 40 comprise one 2D imaging device 41 and one light source 42, the 2D imaging device 41 and the light source 42 are viewing and illuminating the object at a first and a second oblique angle, respectively, and wherein the first and second oblique angles are in the range 45-75° relative to a centre-symmetrical line S of the imaging and light units 40.

According to another aspect of the present disclosure there is provided a method of deriving information relating to at least one feature of an object in a reverse vending machine, the method comprising: providing a plurality of light sources and a plurality of imaging devices arranged as a plurality of imaging and light units 40 around the perimeter of the interior 20 of the reverse vending machine, wherein the imaging and light units 40 comprise one 2D imaging device 41 and one light source 42; obtaining at least one image of the object using at least one 2D imaging device 41 at a first oblique angle $\alpha$ in the range 45-75° relative to a centre-symmetrical line S of the imaging and light units 40; illuminating the object using at least one light source 42 at a second oblique angle $\beta$ in the range 45-75° relative to a centre-symmetrical line S of the imaging and light units 40; and deriving information relating to the at least one feature using an image received from the at least one 2D imaging device 41.

According to another aspect of the present disclosure there is provided an imaging and light source module insertable in a reverse vending machine, comprising: a plurality of imaging and light units 40, wherein the imaging and light units comprise one 2D imaging device 41 and one light source 42 arranged around the perimeter of an opening 32 in a cartridge 31, the opening 32 being adapted to fit around an opening 12 for inserting objects into the reverse vending machine; wherein when the module 30 is inserted in a reverse vending machine, the 2D imaging device 41 and the light source 42 are viewing and illuminating the object at a first and a second oblique angle, respectively, wherein the first and second oblique angles are in the range 45-75° relative to a centre-symmetrical line S of the imaging and light units 40.

Other aspects of the present disclosure are to be understood by the dependent patent claims and the detailed description hereinafter, with reference to the amended figures.

DETAILED DESCRIPTION

In the following description various examples and embodiments of the disclosure are set forth in order to provide the skilled person with a more thorough understanding of the disclosure. The specific details described in the context of the various embodiments and with reference to the attached drawings are not intended to be construed as limitations.

In the exemplary embodiments, various features and details are shown in combination. The fact that several features are described with respect to a particular example should not be construed as implying that those features by necessity have to be included together in all embodiments of the disclosure. Conversely, features that are described with reference to different embodiments should not be construed as mutually exclusive. As those with skill in the art will readily understand, embodiments that incorporate any subset of features described herein and that are not expressly interdependent have been contemplated by the inventor and are part of the intended disclosure. Explicit description of all such embodiments would, however, not contribute to the understanding of the principles of the disclosure, and consequently some permutations of features have been omitted for the sake of simplicity.

The term reverse vending machine as applied to the present application also contemplates systems for recycling of returnable containers where the no return value is paid out when a container is returned, e.g. in waste disposal systems for sorting out recyclable containers.

Figure 1:
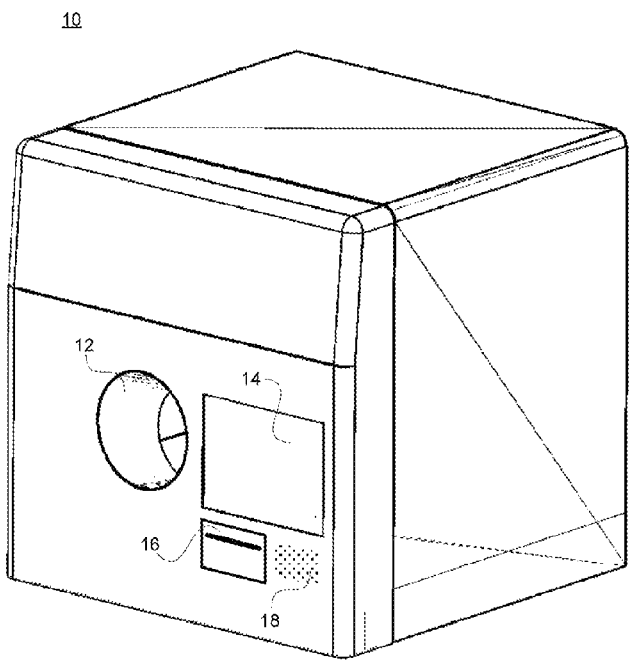
FIG. 1 is a schematic overview of a reverse vending machine.

Reference is now made to FIG. 1, which illustrates in a perspective view a reverse vending machine 10 consistent with the principles of embodiments of the disclosure. The machine can be located for example in a store that accepts receipt of returnable items and positioned such that it is easily accessible to customers with returnable items, and also such that returnable items can be conveniently stored at the rear of the machine, or in a location to which they can be easily transported from the rear of the machine, either automatically or manually.

The front of the machine includes an opening 12 into which returnable items can be entered by the customer. Also provided is a display for providing messages to the customer and an input device allowing the customer to enter simple commands, for example indicating that the customer has entered all their returnable items. As illustrated in FIG. 1, the display and the input device may be combined in the form of a touch screen 14. Alternatively, the display and the input device may be separate devices. The front of the machine 10 may also include a printing device 16 from which a receipt may be delivered to the customer. However, alternative ways of providing the customer with a receipt can also be contemplated, including transmission of an electronic receipt, over a wireless or wired network, to be received by an electronic device such as a cell phone or smartphone in the possession of the customer. The electronic receipt may also be sent directly to a checkout counter, or in the form of electronic payment to the customer's account. The customer may also be invited to select a charity to which the value of the returned items can be donated, using the input device functionality of the touch screen 14.

The machine 10 may also include a loudspeaker 18 or some other form of audible or visual alarm that can be used to issue notifications to the customer or to an operator for example in the case of a malfunction, storage capacity overflow or some other issue that needs attention.

Figure 2:
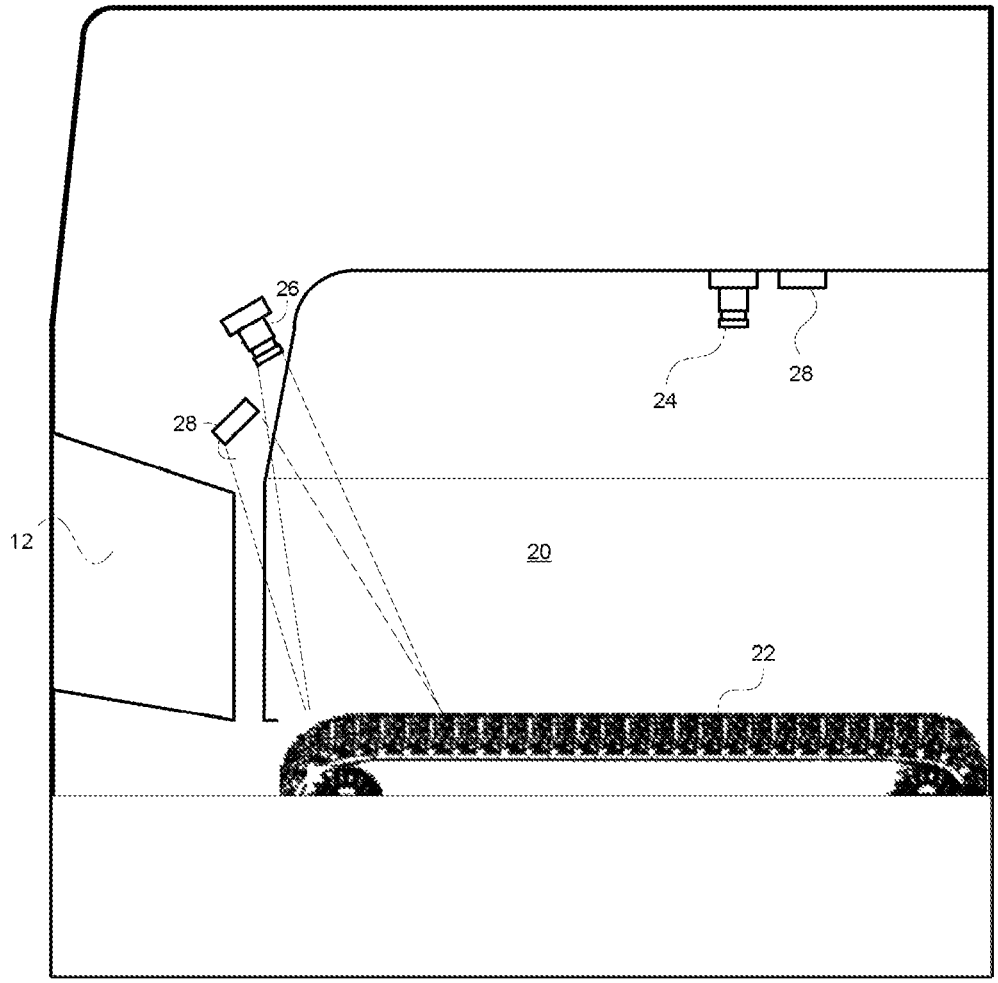
FIG. 2 is a schematic side view of one embodiment of a system according to the present disclosure.

When a customer enters a returnable item into the reverse vending machine 10, the item must be recognized, its authenticity verified and the appropriate value must be determined. FIG. 2 shows a cross sectional view of the most important components along the path traveled by a returnable item that has been inserted into the machine 10. When an item is returned it is entered through the opening 12 into a chamber 20. Inside the chamber there is provided a conveyor 22 capable of transporting the item from the opening 12 at the front of the machine 10 to the rear of the machine 10 where it can be stored or subject to further processing such as for example sorting, further transportation, and destruction.

Traditionally, a returned container is observed by one or more cameras 24 while it is transported through the chamber 20, and the images are analyzed electronically in order to determine the authenticity of the container. Later developments have introduced barcode readers or other devices for recognizing markings on the containers. A number of different types of technologies for barcode readers are known in the art, but the principal features shared by most of them include a light source and a light sensor. The light source can for example be light emitting diodes (LEDs), lasers or lamps, and the light sensor can be one or more photodiodes, or cameras. According to the exemplary embodiment illustrated in FIG. 2, cameras 26 and light sources 28 are arranged adjacent to the opening 12 in a pattern that allows a barcode or other marking to be read while the container is being entered into the chamber 20, but before it is brought to rest on the conveyor 22. Alternative configurations include readers that are positioned inside the chamber 20 or at the end of the conveyor 22. Some of these configurations require that the container can be rotated while inside the chamber in order for any barcode or other marking on the container to become entirely visible to the barcode reader. This has for example been implemented as part of the functionality of the conveyor 22.

The majority of barcode readers in store check-out and reverse vending machines today are laser scanners. However, the laser scanners are gradually being replaced by camera based readers, in particular 2D imaging devices, as 2D imaging devices and image processing techniques allow more features than merely decoding the bar code, such as analyzing advanced security mark features, or the shape, color and materials an object is composed of. The two types of readers have very different illumination and imaging geometries, which means they are faced with different problems when reading highly reflective surfaces. White bars on a reflective background gives very good contrast for a laser reader, thus this has become a very popular way of printing barcodes on aluminum cans. A 2D imaging device based reader has more difficulty in handling this kind of print on shiny objects in general, and on dented shiny objects in particular. This is particularly due to the fact that shiny surfaces cause specular reflexes that make the barcode, or parts of the barcode, unreadable. Hereinafter, is a 2D imaging device for simplicity referred to as a camera.

One known solution to get around this problem is to use polarized light and a crossed polarizer in front of the camera. However, this solution is costly to produce and leads to unwanted loss of light. According to an exemplary embodiment of the present embodiment an alternative solution is proposed wherein light from the light sources is angled on the object with an angle relative to the camera such that substantially all specular reflections are directed away from the camera lens. FIG. 2 illustrates one possible embodiment of such a system, where cameras 26 and as well as light sources 28 are arranged adjacent to the opening 12, the light from the light sources 28 being directed onto an object in the chamber 20. The specular component of the reflected light is reflected towards the other end of the chamber opposite the light source and the cameras, while the scattered component of the reflected light is reflected into all directions, a part of this scattered component goes towards the camera to create the desired imaging. Light can be angled onto the object by way of light sources emitting light at a given angle, or by mirrors redirecting light to the desired angle.

Although one could consider employing only one camera 26 and one light source 28, inclusion of more than one camera and/or light sources improves illumination conditions and the field of view of the camera system. These additional cameras and light sources may be separate elements, or they may be arranged in a module of cameras and light sources for easy assembly into the reverse vending machine. In one alternative embodiment of the present disclosure a plurality of the one camera 26 and the one light source 28 is arranged in a plurality of imaging and light units 40, each imaging and light unit 40 comprising one camera 41 and one light source 42. Although only one imaging and light unit 40 is shown in FIG. 3, at least five imaging and light units 40 are arranged around the perimeter of the chamber 20, such that the camera 41 and the light source 42 is viewing and illuminating an object in the chamber at a first and second oblique angle, respectively, wherein the first and second oblique angles are in the range 45-75° relative to a centre-symmetrical line S of the imaging and light units 40.

Figure 3:
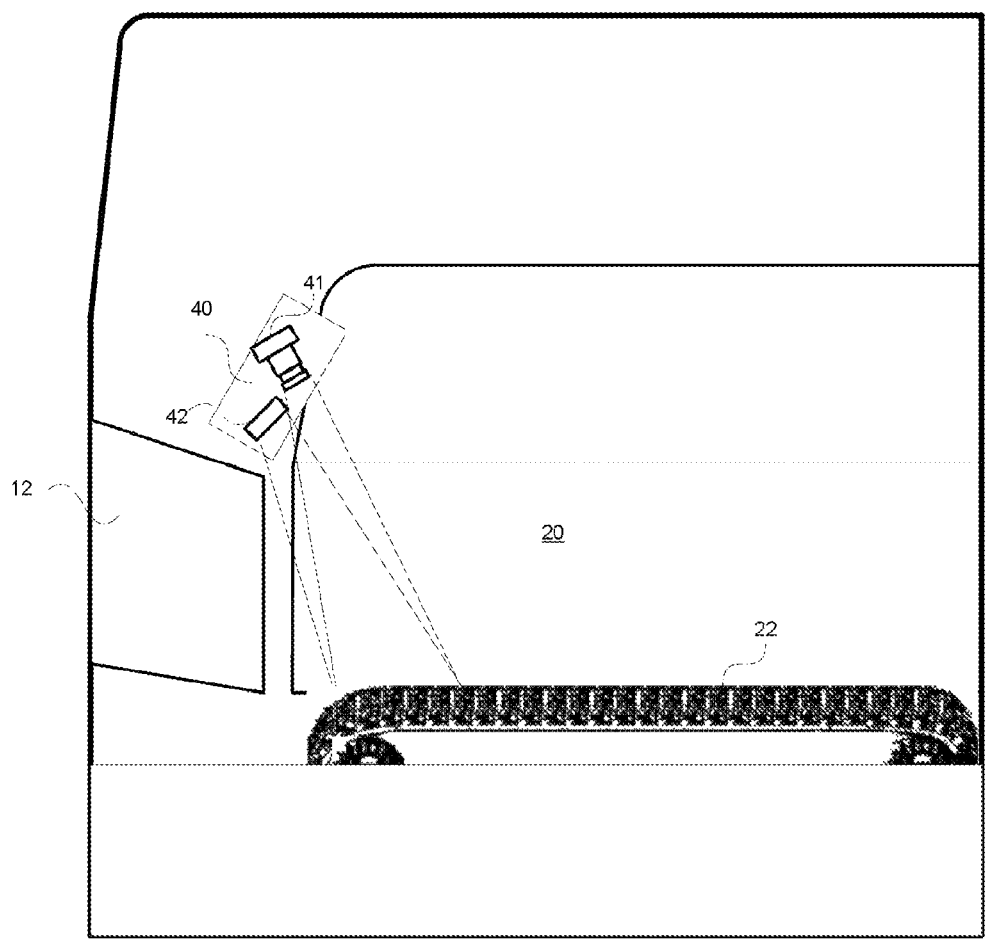
FIG. 3 is a schematic side view of another embodiment of a system according to the present disclosure.

Although, the imaging and light units 40 illustrated in FIG. 3 are arranged around the perimeter of the opening 12, other positions of arrangement around the chamber 20 could be envisaged, such as at the end of the chamber or any position between the opening and the end of the chamber.

Figure 4:
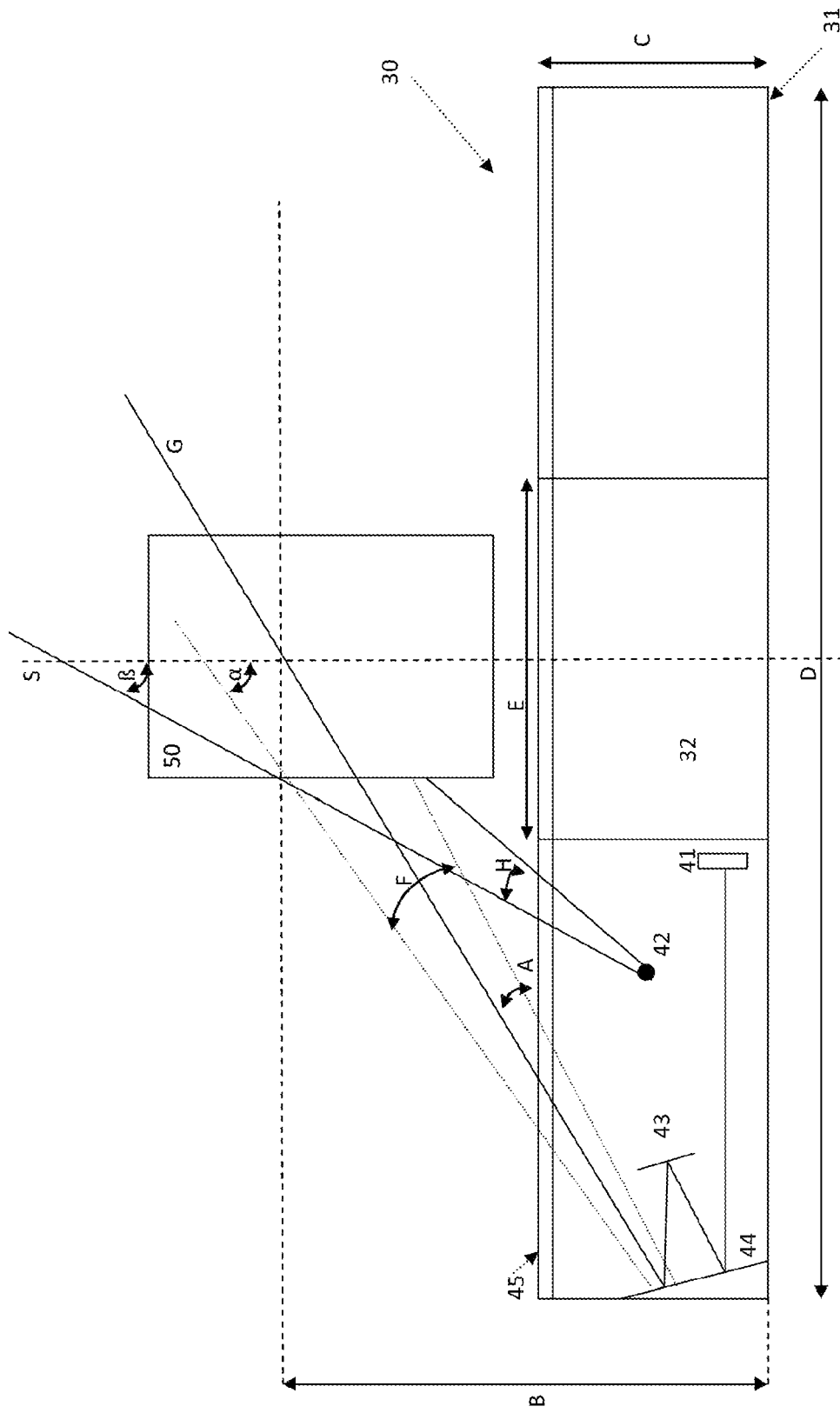
FIG. 4 is a schematic cross section of an imaging and light source module 30 according to an embodiment the present disclosure.

An imaging and light source module 30 according to an embodiment of the present disclosure is illustrated in FIG. 4, where on the left side an imaging and light unit 40 is shown. The plurality of imaging and light units 40 are arranged in a cartridge 31 for easy assembly in a reverse vending machine. The diameter and thickness of the module 30 is denoted D and C, respectively, and the depth of the system including a reading gap for reading the feature of the object is denoted B. The opening 32 is dimensioned to accept objects of different sizes, typically having diameters in the range 50-130 mm. For a customer to be able to put an object into the opening, e.g. without a hand being stuck between the wall of the opening and the object, the opening is typically dimensioned to accommodate a hand holding an object, while at the same time being as small as possible. The diameter of the opening 32 is denoted E. The center axis of field of view of the camera 41 is illustrated with the line denoted G, and the field of view of the camera 41 is denoted F. The light source 42 is for simplicity shown as a point source having spread angle of light H, but could also comprise multiple light sources. Although only one imaging and light unit 40 is shown in FIG. 4, at least five imaging and light units 40 are arranged around the opening 32, such that the camera 41 and the light source 42 is viewing and illuminating an object 50 in the chamber at an oblique angle relative to a centre-symmetrical line S of the plurality of imaging and light units 40. The centre-symmetrical line of the plurality of imaging and light units is denoted S.

According to one exemplary embodiment of the present disclosure illustrated in FIG. 4, light source 42 is positioned such that the light source, having a spread angle of light H, at least illuminates the parts of the object 50 within the field of view of the camera 41. The light source 42 is positioned between the outer diameter of the opening 32 and the center axis of the field of view of the camera 41 such that light from the light source 42 is directed onto the object 50 with an angle directing specular reflections away from the camera lens. The light source 42 may also be positioned further from the outer diameter of the opening 32, or substantially at the center axis of the field of view of the camera 41. In FIG. 4 the light source is positioned towards the outer diameter of the opening 32 such that the object 50 is illuminated at an oblique angle relative to a centre-symmetrical line S of the imaging and light units (40). The light passes layer 45 at closer to a perpendicular angle as the light source is positioned closer to the outer diameter of the opening 32, reducing reflections on the inner surface of layer 45, hence increasing the pass-through of light. On the other hand, as the light source is moved towards the outer diameter of the opening 32, the difference in the path of light from the light source to the upper and lower part of the illumination area increases, thus the uniformity of the illumination is reduced. On the other hand, the uniformity of the illumination increases as the light source 42 is moved away from the opening 32 towards the mirrors 43, 44, thus in the exemplary embodiment of FIG. 4, the light source 32 is positioned as close as possible to the backside of mirror 43.

According to an exemplary embodiment of an imaging and light unit 40 of the present disclosure illustrated in FIG. 4, the light source 42 consists of an array of LED's, alternatively one or more lamps. The array of multiple LEDs can include single color LED's having wavelengths ranging from less than 400 nm (UV-light) up to higher than 760 nm (IR-light) and/or white LED's. Furthermore, the array of multiple LED's may be provided with only one type of LED, or a combination of different types of LED's according to the illumination requirements of the reverse vending machine.

Furthermore, the unit 40 illustrated in FIG. 4 is provided with two mirrors 43, 44, directing incoming light from the object onto the camera 41 positioned in front of the unit 40, close to the opening 32. Incoming light from the object first hits the first mirror 44 and is redirected onto the second mirror 43, then redirected onto the first mirror 44, and finally redirected onto the camera 41. When the light passes from the first mirror 44 onto the camera 41, the light passes under the second mirror 43, or alternatively through an opening in the second mirror 43. Passing the light back and forth between the two mirrors 43 and 44 increases the optical distance from the camera to the object. Thus it is possible to obtain images with little or no perspective distortion (wide angle distortion). By this configuration it is possible to obtain images with sufficient resolution to decode small features of the object irrespective of the difference in viewing distance between small objects (small diameter) and large objects (large diameter). The causes and effects of perspective distortion are well known by those with skill in the art, and will not be discussed in any detail here.

In an alternative embodiment of the present disclosure, the mirrors 43, 44 are not used, and camera 41, or alternatively an array of cameras, is positioned such that the camera 41 facing the chamber, e.g. where mirror 44 is positioned in FIG. 4.

As described above, the viewing distance along G should be as long as possible to obtain images with sufficient resolution to decode the features of small objects (small diameter) as well as large objects (large diameter), and as seen in FIG. 4 increasing the diameter D of the module 30 increases the viewing distance. As the diameter D is increasing, improving distortion, the angle of incident light from an object 50 on a layer 45, e.g. angle A, is also decreasing, thus more light is reflected away from the camera resulting in an increased light loss. On the other hand, distortion may also be reduced by viewing the object 50 at a less sharp angle, i.e. decreasing A, achievable by bringing the reading gap closer to the opening 32, and changing the viewing angle of camera 41, i.e. changing the angles of mirrors 43, 44, accordingly. The less sharp viewing angle obtained by a small A also reduces the depth of field requirement. While bringing the reading gap closer to the opening 32 gives a less sharp viewing angle, the corresponding change in viewing angle of camera 41 simultaneously decreases the angle of incident light from the object 50 on layer 45, hence light loss increases. Increasing A again, by increasing the diameter D of module 30, reduces light loss and specular reflexes, as well as increasing the viewing distance as described above. Now that the reading gap is closer to the opening 32, an optimal point of distortion, depth of field, light loss, specular reflexes is reached at a lower diameter D. Thus, together with the reduced depth B of the system, this configuration allows a more compact module 30 to be achieved.

Although kept constant in the discussion above, it is further contemplated by embodiments of the present disclosure that the optical properties of the system may be changed by altering the optical properties of the layer 45, e.g. altering the refractive index of the layer 45 or coating the layer 45 with an anti-reflective coating, such that more light is allowed to pass the layer 45 at more narrow angles. In an exemplary embodiment of the present disclosure as discussed above, the angle A is in the range 20-45°. According to one embodiment of the present disclosure the layer 45 is provided with an anti-reflective coating, such that the incident light from the object 50 on the layer 45, i.e. angle A, may be as low as 15°. That is, the available range of the viewing and illumination angles towards an object 50 in the chamber can be extended from somewhere between 45 and 70° relative to the centre-symmetrical line S of the imaging and light units 40 to as high as 75° relative to the centre-symmetrical line S of the imaging and light units 40. The anti-reflective coating thus ensures that the upper limit of the range of the first and second oblique angles (α, β) at 75° can be achieved without excessive light loss due to reflection.

Figure 5:
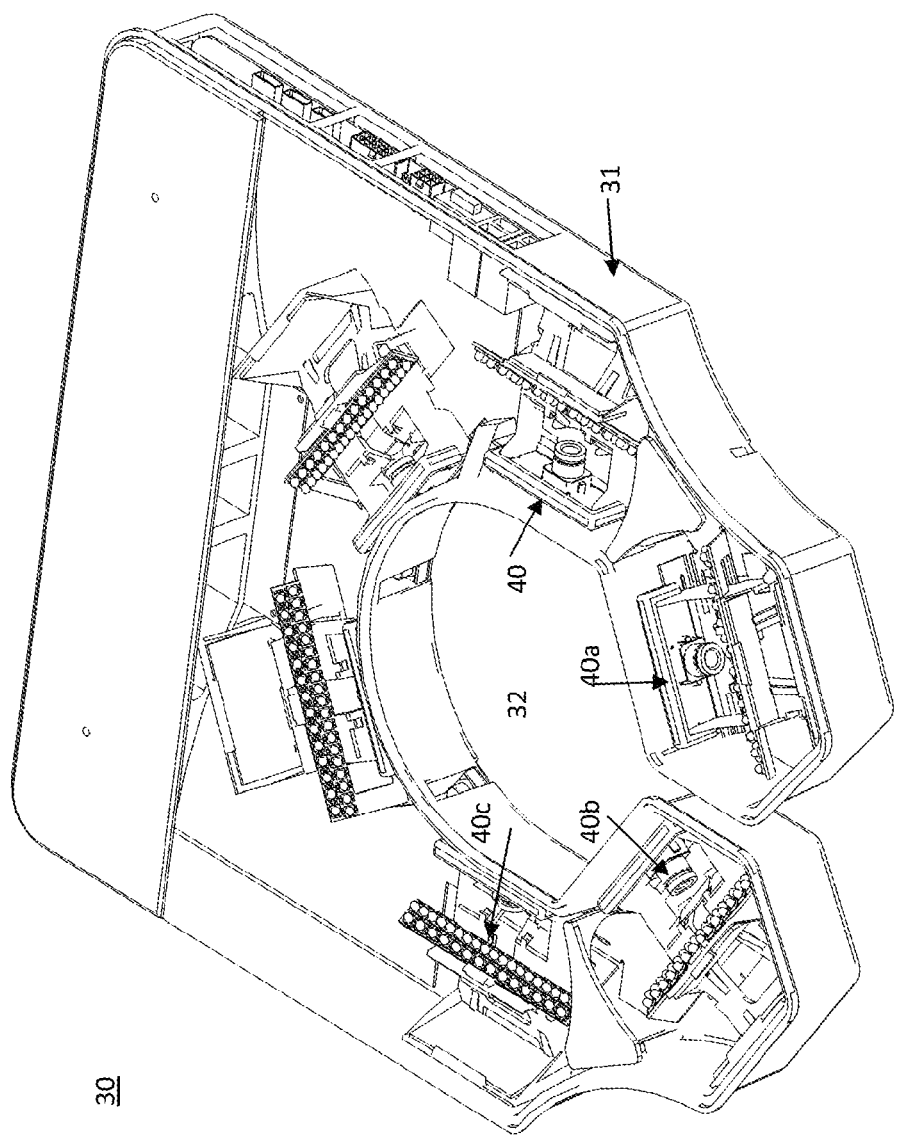
FIG. 5 is a schematic overview of another imaging and light source module 30 according to an embodiment the present disclosure.

FIG. 5 illustrates an exemplary embodiment of an imaging and light source module 30 according to the present disclosure illustrating six imaging and light units 40, each comprising one camera 41 and one light source 42, wherein the one camera 41 and the one light source 42 of the plurality of imaging and light units 40 are arranged on one common circuit board, wherein the one camera 41 and the one light source 42 are oriented out of a base plane of the common circuit board. In the imaging and light source module of FIG. 5, the one camera 41 is oriented at a 90° angle on the common circuit board, while the one light source is oriented at a 60° angle on the common circuit board.

Figure 7:
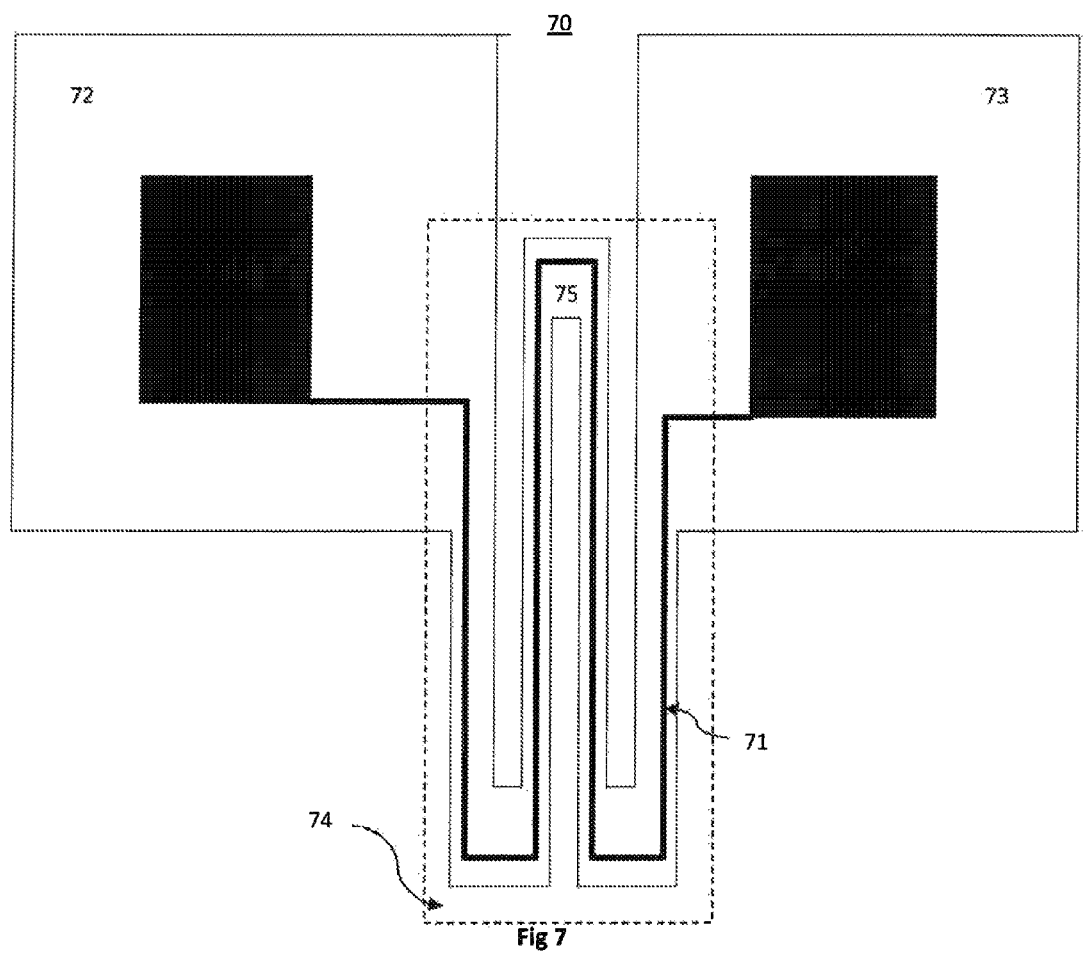
FIG. 7 is a schematic overview of a twistable substrate according to an embodiment the present disclosure.

According to one exemplary embodiment illustrated in FIG. 7 the common circuit board comprising a substantially rigid substrate 70 with an electrically conductive pattern 71, wherein the substrate includes a base portion 72 and a second portion 73 which are interconnected by a meander-shaped twisting region 74, and the twisting region further comprising at least one twistable, elongated element 75 defined by through-going recesses in the substrate, and the at least one element is arranged substantially parallel to a twisting axis of the board, such that the one camera 41 or the one light source 42 when arranged on the second portion is twistable out of the plane of base portion of the substrate.

Dents in cans and/or bottles provides specular surfaces reflecting light in an unpredictable way, often creating errors when reading the barcode. Because the angle between the viewing angle of the camera and the angle of the incoming light on the object is fixed and the position of the can does not change much between consecutive exposures, even consecutive images may exhibit the same error, eventually causing failure in reading the barcode. Thus, according to an exemplary embodiment of the present disclosure, adjacent cameras (40a, 40b, 40c . . . ) are arranged such that the field of view of adjacent cameras is arranged such that they overlap each other. Adjacent cameras may be arranged such that an area of an object which is in the field of view of one camera is also within the field of view of at least one adjacent camera. By this arrangement, a specular reflection observed by one camera will in most cases not be observed by an adjacent camera observing the same area. An image of the entire barcode without specular reflections can then be created based on visible parts of the barcode from several images obtained from several cameras, thus allowing successful reading of barcodes and other marks on dented cans and/or bottles.

Combining several images into one image relies on overlap between fragments (i.e. visible part of barcode), or as a minimum a "touch" between the fragments from a sequence of consecutive images from one camera, overlapping images from adjacent cameras or a combination of both. As such, combined images can be performed on images overlapping in space (i.e. images by neighboring cameras), in time (i.e. consecutive images by one camera), or a combination of both. In one exemplary embodiment the camera 41 is a freeze frame digital image sensor, which allows capturing images with low motion blur and high speed.

According to an exemplary embodiment of the present disclosure, the imaging and light units 40 surrounding the opening 32 may be configured to allow individual control of the camera 41 and the light source 42 of each of the imaging and light units 40. This allows for selecting different illumination schemes and imaging schemes dependent on conditions and/or the specifications of the reverse vending machines. In particular the system may allow activation of all light sources 42 and all cameras 41 on all units simultaneously; activating light source 42 and camera 41 for each of the units sequentially; and activating the camera of one unit 41b while activating the light sources of the adjacent units 40a, 40c, sequentially for all the units. The latter configuration creates a sharper illumination angle of the can or bottle with respect to the camera, thereby reducing specular reflections observed by the middle camera unit 41b. Traditionally different cameras have been used to read the different features of an object in a reverse vending machine, typically one camera arrangement has been used for reading the barcode and another camera arrangement for the shape, or contour, of an object. According to an exemplary embodiment of the present disclosure the camera 41 is utilized for reading the shape of an object or part of the object, as well as a bar code, a security mark or a deposit mark.

Figure 6:
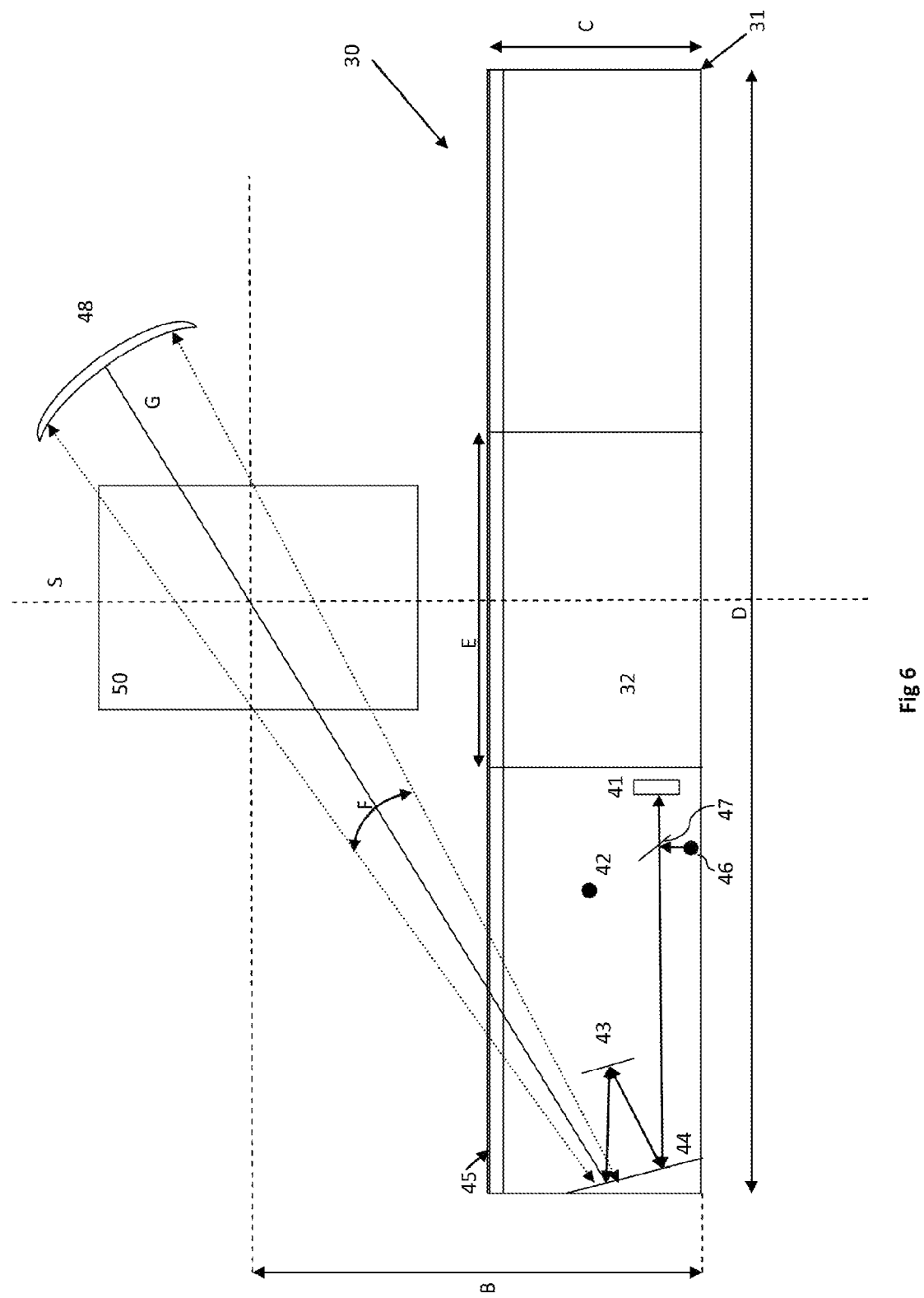
FIG. 6 is a schematic cross section of another embodiment of an imaging and light source module 30 according to the present disclosure.

One exemplary embodiment for reading the shape of the object is illustrated in FIG. 6, wherein the imaging and light units 40 are further provided with a beam splitter 47 arranged at a 45° angle in front of the camera 41, and a light source 46, typically a LED. The light source 46 is arranged on the other side of the beam splitter 47 from the camera 41 at a distance identical to the distance from the beam splitter 47 to the aperture of the camera 41. The beam splitter redirects light emitted from the light source 46 towards the mirrors 43, 44, following a path substantially identical to the field of view of the camera 41 onto a retro-reflector 48 in the chamber. The retro-reflector 48 is directing the received light back in the same direction as received. On the return path the light pass the beam splitter 47 onto the camera 41. The light source 46 and the beam splitter 47 are thus configured such that the light source 46 and the camera 41 are optically co-located as seen from the retro-reflector 48. In the embodiment illustrated the retro-reflector is flat or slightly curved. However, other configurations are possible. Alternatively, a flat mirror could be used in combination with a Fresnel lens, as described in U.S. Pat. No. 5,898,169.

The image viewed by the camera will show the contour of the bottle totally dark and with such sharp image as the camera is able to reproduce. The reason for the perfect, dark outline is as follows. Without any article located in the path of light the camera field of view will be filled by light from the light source 46, i.e. causing the image to be completely bright. If some parts of the light are deflected relative to its normal direction, those parts of the light will not reach the camera 41, and those portions will become dark. This is in particular the situation with a transparent bottle of glass or plastics. The material of such bottles will refract the light to cause it to change direction. Such refraction is in particular strong at the outline, which therefore appears to be dark. The thicker the walled bottle present in the chamber, the wider the dark outline. A glass bottle having a somewhat thick wall will in most cases appear to be dark all over. Even quite thin walled bottles of plastics provide a sharp and excellent outline.

The embodiment described with reference to FIG. 6 gives very good contrast for thin walled bottles, but other embodiments of reading the shape of the object is possible, including replacing the retro-reflector with a background panel for any objects in the chamber. Such a background may be an all white or black background, but one may also consider structuring the background with a pattern clearly different from a bottle, such as a checker-board pattern. The background panel may be either front side illuminated or back side illuminated, typically an electroluminescent panel, LED panel or similar. In this case the light source 46 and beam splitter 47 is not required.

Now returning to FIGS. 4 and 5, according to yet another exemplary embodiment of the present disclosure, the cartridge 31 is provided with a transparent or translucent layer 45 positioned in front of the imaging and light source units 40 to protect the imaging and light source units from spill and splashes from objects thrown through the opening 12, 32. The transparent or translucent layer can be made of glass, polymer glass (e.g. Polymethyl methacrylate (acrylic glass) and Polyethylene terephthalate (PET)) or other suitable transparent or translucent materials. The transparent or translucent layer 45 may be shaped as a substantially flat sheet, which when installed on the cartridge 31 and installed in the reverse vending machine constitutes a substantially vertical plane relative to the centre-symmetrical line S of the imaging and light units 40, the vertical plane allowing spills and splashes to simply flow towards the bottom of the reverse vending machine. In another embodiment the transparent or translucent layer 45 might be shaped or positioned such that, when installed on the cartridge 31 and installed in the reverse vending machine, the layer 45 constitutes a slightly inwards inclined plane relative to the centre-symmetrical line S of the imaging and light units 40 further simplifying the flow of spills and splashes towards the bottom of the machine. The transparent or translucent layer 45 may also be concave where the top of the concave surface pointing out of the machine, or curved in any other appropriate shape. In yet another embodiment of the present disclosure the layer 45 is opaque in areas not required for imaging and illumination.

Figure 8:
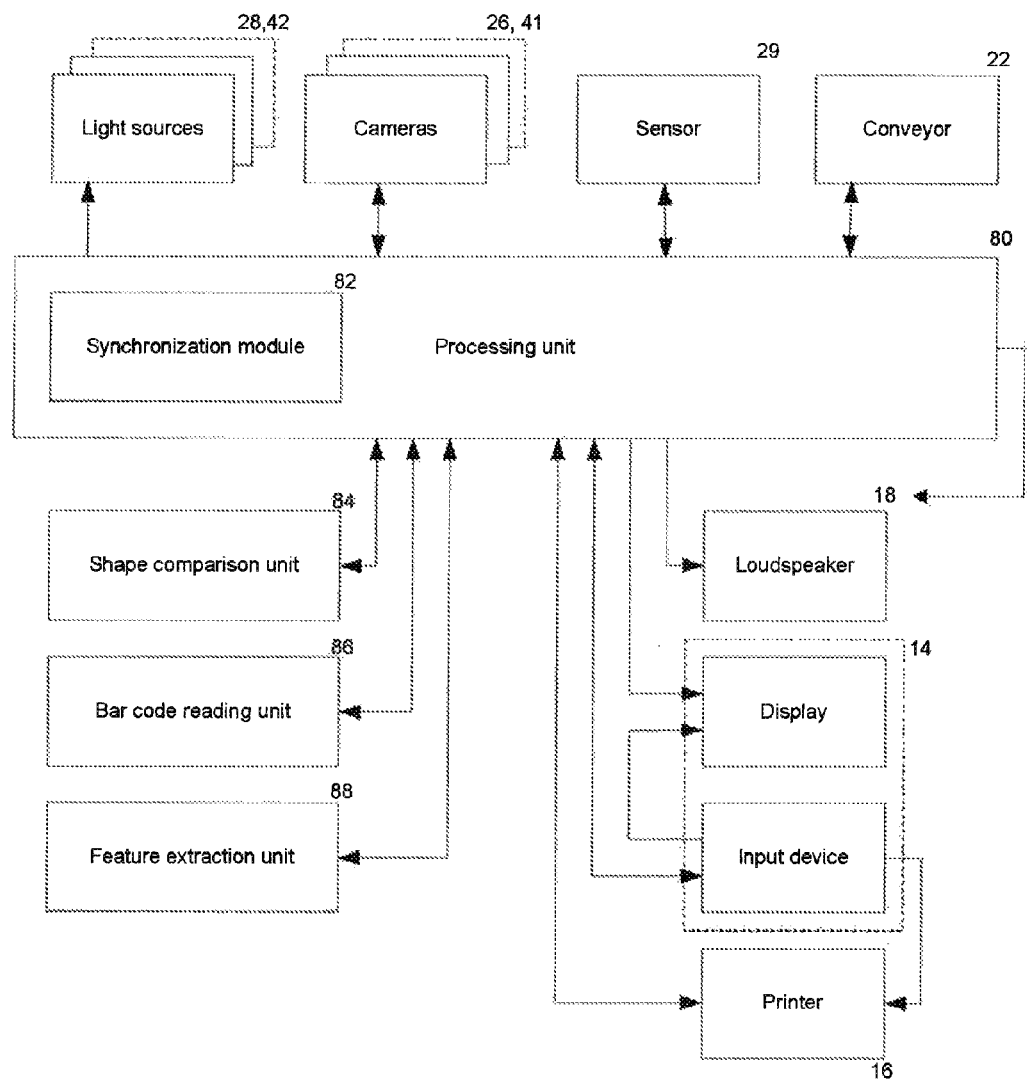
FIG. 8 is a block diagram illustrating the various components of a reverse vending machine configured to implement an embodiment of the disclosure.

Reference is now made to FIG. 8, which is a block diagram illustrating the various components of an exemplary embodiment of a reverse vending machine operating in accordance with the principles of embodiments of the disclosure. A number of light sources 28, 42 are connected to processing unit 80 which includes a synchronization module 82. The synchronization module 82 may be configured to control any required synchronized operation of the light sources 28, 42, the cameras 26, 41, an optional sensor 29, for example a sensor being based on ultrasound or laser technology, and the conveyor 22, such as controlling which light sources 28, 42 illuminate the chamber when a particular camera 26, 41 is activated, or ensuring that two or more cameras are activated simultaneously or in a particular sequence, as dictated by any of the embodiments described above or combinations thereof. Data returned from the cameras 26, 41, the optional sensor 29 and conveyor 22 are received by the processing means 80. Further, the reverse vending machine may include a comparison module 84 configured to compare an image detected by the camera 26, 41 to recognize a contour image of a particular returned object and communicating such recognition back to the processing unit 80. Input from and output to a user may be received by and controlled by the processor unit 80, respectively, through a display and input device which may be combined in a touch screen 14, a printer 16 and a loudspeaker 18.

The reverse vending machine may also include a bar code reading unit 86 and a feature extraction unit 88. The feature extraction unit 88 may, depending on the requirements of the reverse vending machine, recognize and analyze features such as advanced security mark features or the color and materials a returned object is composed of, and communicating such recognition back to the processing unit 80. Those with skill in the art will realize that the shape comparison unit 84, the bar code reading unit 86 and the feature extraction unit 88 may be implemented as software stored in a storage device (not shown) and configured to be executed by the processing unit 80. These units may also be fully or partly implemented as separate processors, graphic processors, field programmable gate arrays (FPGA), application specific integrated circuits (ASIC), or a combination thereof. Furthermore, several of the various algorithms, instructions and hardware implementing these units may operate as part of more than one such unit. For example, algorithms implemented as software modules in the bar code reading unit 86, may double as part of one or more feature extraction functions that are part of the feature extraction unit 88.

Those with skill in the art will also understand that additional components that are not illustrated in FIG. 8 may be part of a reverse vending machine or a system of reverse vending machines. Such components may, for example, include a power supply, a communication interface for communication with remote computers or storage units, various storage units including volatile and non-volatile memory units, databases etc.

The invention claimed is:

1. A reverse vending machine comprising an opening for inserting objects into an interior of the machine, a plurality of light sources and a plurality of 2D imaging devices, wherein the plurality of 2D imaging devices and the plurality of light sources are arranged as a plurality of imaging and light units around a perimeter of the interior, said imaging and light units each comprise one 2D imaging device and one light source, the 2D imaging device and the light source are viewing and illuminating the object at a first and a second oblique angle, respectively, and wherein the first and second oblique angles are in the range 45-75° relative to a centre-symmetrical line of the imaging and light units, wherein the reverse vending machine is provided with a transparent or translucent layer positioned to have each of the imaging and light source units on a first side of the layer, and to have a location, where the object is situated when being viewed and illuminated, on a second side of the layer, the second side being opposite the first side;

wherein the transparent or translucent layer is arranged substantially orthogonal relative to the centre-symmetrical line of the imaging and light units.

2. The reverse vending machine according to claim 1, comprising at least five imaging and light units.

3. The reverse vending machine according to claim 1, the machine further comprising a feature extraction unit adapted to derive information relating to at least one feature of the object, wherein the at least one feature is one or more of a barcode, a security mark, a deposit mark, a shape of the object or part of the object, a color of the object and materials the object is composed of.

4. The reverse vending machine according to claim 1, wherein the first oblique angle and the second oblique angle are substantially identical.

5. The reverse vending machine according to claim 1, wherein the field of view of adjacent 2D imaging devices are overlapping such that an area of an object which is within the field of view of one 2D imaging device is also within the field of view of at least one adjacent 2D imaging device.

6. The reverse vending machine according to claim 1, wherein the 2D imaging device is a freeze frame digital image sensor.

7. The reverse vending machine according to claim 1, wherein the transparent or translucent layer positioned in front of the imaging and light source units.

8. The reverse vending machine according to claim 1, wherein the transparent or translucent layer is opaque in areas not required for imaging and illumination.

9. The reverse vending machine according to claim 1, wherein the transparent or translucent layer is provided with an anti-reflective coating.

10. The reverse vending machine according to claim 9, wherein the anti-reflective coating ensures that the upper limit of the range of the first and second oblique angles at 75° can be achieved without excessive light loss due to reflection.

11. The reverse vending machine according to claim 1, wherein the translucent layer is a substantially flat sheet, constituting a substantially vertical plane relative to the centre-symmetrical line of the imaging and light units.

12. The reverse vending machine according to claim 1 wherein the transparent or translucent layer is arranged to constitute a slightly inwards inclined plane relative to the centre-symmetrical line of the imaging and light units.

13. The reverse vending machine according to claim 1, wherein the transparent or translucent layer is concave with the top of the concave surface pointing out of the reverse vending machine.

14. The reverse vending machine according to claim 1, wherein the transparent or translucent layer is made of glass or polymer glass.

15. The reverse vending machine according to claim 1, further comprising:
a retro-reflector, a beam splitter and a light source; and wherein the 2D imaging device is configured to view an object contour against the retro-reflector, and
the light source and the beam splitter are configured such that the light source and the 2D imaging device are optically co-located as seen from the retro-reflector.

16. The reverse vending machine according to claim 1, further comprising:
a background panel; and wherein the 2D imaging device is configured to view an object contour against the background panel.

17. The reverse vending machine according to claim 16, wherein the background panel is all white, all black or provided with a pattern clearly different from a bottle.

18. A method of deriving information relating to at least one feature of an object in a reverse vending machine, the method comprising:
providing a plurality of light sources and a plurality of 2D imaging devices arranged as a plurality of imaging and light units around the perimeter of the interior of the reverse vending machine, wherein said imaging and light units (40) each comprise one 2D imaging device and one light source;
obtaining at least one image of the object using at least one 2D imaging device at a first oblique angle in the range 45-75° relative to a centre-symmetrical line of the imaging and light units;
illuminating the object using at least one light source at a second oblique angle in the range 45-75° relative to a centre-symmetrical line of the imaging and light units; and
deriving information relating to the at least one feature using the at least one image obtained by the at least one 2D imaging device,
wherein the reverse vending machine is provided with a transparent or translucent layer positioned to have each of the imaging and light source units on a first side of the layer, and to have a location, where the object is situated when being viewed and illuminated, on a second side of the layer, the second side being opposite the first side;
wherein the transparent or translucent layer is arranged substantially orthogonal relative to the centre-symmetrical line of the imaging and light units.

19. The method according to claim 18, further comprising:
arranging the imaging and light units such that the fields of view of adjacent 2D imaging devices are substantially overlapping each other; and
combining visible parts of the at least one feature from the adjacent 2D imaging devices into one image of the at least one feature.

20. The method according to claim 19, further comprising:
combining the visible parts of the at least one feature from the adjacent 2D imaging devices and from the sequence of consecutive images from the adjacent 2D imaging devices into one image of the at least one feature.

21. The method according to claim 18, further comprising:
combining visible parts of the at least one feature from a sequence of consecutive images from one 2D imaging device into one image of the at least one feature.

22. The method according to claim 18, wherein the first oblique angle and the second oblique angle are substantially identical.

23. The method according to claim 18, wherein the method further comprises activating the light source and the 2D imaging device for each of the units sequentially.

24. The method according to claim 18, wherein the method further comprises activating the 2D imaging device of one unit while only activating the light sources of the adjacent units, sequentially for all units.

25. The method according to claim 18, wherein the at least one feature is an object contour obtained using the 2D imaging device which is configured to view a returned object contour against a background including a retro-reflector, and where a light source and a beam splitter are configured such that the light source and the 2D imaging device are optically co-located as seen from the retro-reflector.

26. The method according to claim 18, wherein the at least one feature is an object contour obtained using the 2D imaging device which is configured to view a returned object contour against a background panel.

27. The method according to claim 26, wherein the background panel is all white, all black or provided with a pattern clearly different from a bottle.

28. The method according to claim 18, wherein the at least one feature is one or more of a barcode, a security mark, a deposit mark, a shape of the object, a color of the object and materials the object is composed of.

29. An imaging and light source module insertable in a reverse vending machine, comprising:
- a plurality of imaging and light units, wherein said imaging and light units each comprise one 2D imaging device and one light source, the plurality of imaging and light units arranged around the perimeter of an opening in a cartridge, the cartridge opening being adapted to fit around an opening for inserting objects into the reverse vending machine;
- wherein, when the module is inserted in a reverse vending machine, the 2D imaging device and the light source are viewing and illuminating the object at a first and a second oblique angle, respectively, wherein the first and second oblique angles are in the range 45-75° relative to a centre-symmetrical line of the imaging and light units,
- wherein the reverse vending machine is provided with a transparent or translucent layer positioned to have each of the imaging and light source units on a first side of the layer, and to have a location, where the object is situated when being viewed and illuminated, on a second side of the layer, the second side being opposite the first side;
- wherein the transparent or translucent layer is arranged substantially orthogonal relative to the centre-symmetrical line of the imaging and light units.

30. The imaging and light source module according to claim 29, comprising at least five imaging and light units.

31. The imaging and light source module according to claim 29, wherein first oblique angle and the second oblique angle are substantially identical.

32. The imaging and light source module according to claim 29, wherein the fields of view of adjacent 2D imaging devices are overlapping such that an area of an object which is in the field of view of one 2D imaging device is also within the field of view of at least one adjacent 2D imaging device.

33. The imaging and light source module according to claim 29, wherein the one 2D imaging devices and the one light source of the plurality of imaging and light units are arranged on one common circuit board, wherein the one 2D imaging device and the one light source are positioned out of a base plane of the common circuit board.

34. The imaging and light source module according to claim 33, wherein the common circuit board is comprising a substantially rigid substrate with an electrically conductive pattern, wherein the substrate includes a base portion and a second portion which are interconnected by a meander-shaped twisting region, and the twisting region further comprising at least one twistable, elongated element defined by through-going recesses in the substrate, and the at least one element is arranged substantially parallel to a twisting axis of the board, such that the one 2D imaging device or the one light source when arranged on the second portion is twistable out of the plane of base portion of the substrate.

35. The imaging and light source module according to claim 29, wherein the cartridge is provided with a transparent or translucent layer positioned in front of the imaging and light source units.

36. The imaging and light source module according to claim 35, wherein the transparent or translucent layer is opaque in areas not required for imaging and illumination.

37. The imaging and light source module according to claim 35, wherein the transparent or translucent layer is provided with an anti-reflective coating.

38. The imaging and light source module according to claim 37, wherein the anti-reflective coating ensures that the upper limit of the range of the first and second oblique angles at 75° can be achieved without excessive light loss due to reflection.

39. The imaging and light source module according to claim 35, wherein the translucent layer is a substantially flat sheet, and which when inserted in the reverse vending machine constitutes a substantially vertical relative to the centre-symmetrical line of the imaging and light units.

40. The imaging and light source module according to claim 35, wherein the transparent or translucent layer is arranged, when inserted in the reverse vending machine, to constitute a slightly inwards inclined plane relative to the centre-symmetrical line of the imaging and light units.

41. The imaging and light source module according to claim 35, wherein the transparent or translucent layer is concave with the top of the concave surface pointing out of the reverse vending machine when inserted therein.

42. The imaging and light source module according to claim 35, wherein the transparent or translucent layer is made of glass or polymer glass.

* * * * *